(12) United States Patent
Schweitzer

(10) Patent No.: US 8,991,619 B2
(45) Date of Patent: Mar. 31, 2015

(54) FILTER ASSEMBLY WITH WATER EVACUATION AND METHODS

(75) Inventor: Stephen Schweitzer, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 450 days.

(21) Appl. No.: 13/429,990

(22) Filed: Mar. 26, 2012

(65) Prior Publication Data

US 2013/0248464 A1    Sep. 26, 2013

(51) Int. Cl.
| | | |
|---|---|---|
| *B01D 29/13* | (2006.01) | |
| *B01D 29/21* | (2006.01) | |
| *B01D 36/00* | (2006.01) | |
| B01D 29/00 | (2006.01) | |

(52) U.S. Cl.
CPC .............. *B01D 29/21* (2013.01); *B01D 36/003* (2013.01); *B01D 2201/0415* (2013.01); *B01D 2201/291* (2013.01); *B01D 2201/34* (2013.01); *Y10S 210/05* (2013.01)
USPC ........... 210/437; 210/440; 210/443; 210/450; 210/493.2; 210/DIG. 5; 210/438; 210/299; 210/303

(58) Field of Classification Search
CPC ............. B01D 36/003; B01D 2201/34; B01D 2201/0415; B01D 29/21; B01D 2201/291
USPC .................. 210/791, 407, 437, 440, 443, 450, 210/493.2, DIG. 5, 438, 338, 299, 303
See application file for complete search history.

(56) References Cited

U.S. PATENT DOCUMENTS

| | | |
|---|---|---|
| 1,761,924 A | 6/1930 | Kamrath |
| 3,361,260 A | 1/1968 | Buckman |
| 3,370,708 A | 2/1968 | Hultgren et al. |
| 3,384,241 A | 5/1968 | Nostrand |
| 3,420,377 A | 1/1969 | Vandersip |
| 3,931,011 A | 1/1976 | Richards et al. |
| 3,988,244 A | 10/1976 | Brooks |
| 4,017,397 A | 4/1977 | Copeland |
| 4,372,847 A | 2/1983 | Lewis |
| 4,719,012 A | 1/1988 | Groezinger et al. |
| 4,812,235 A | 3/1989 | Seleman et al. |
| 4,915,831 A | 4/1990 | Taylor |
| 5,078,877 A | 1/1992 | Cudaback et al. |

(Continued)

FOREIGN PATENT DOCUMENTS

| | | |
|---|---|---|
| DE | 199 60 600 A1 | 6/2001 |
| EP | 0 839 563 A1 | 5/1998 |

(Continued)

OTHER PUBLICATIONS

Dahl Baldwin, Marine Diesel Fuel/Water Separators, Installation pamphlet, 2005, 10 pages.

*Primary Examiner* — Nam Nguyen
*Assistant Examiner* — Madeline Gonzalez
(74) *Attorney, Agent, or Firm* — Reinhart Boerner Van Deuren P.C.

(57) ABSTRACT

A filter assembly, a filter cartridge and method of filter fluid are provided. The filter assembly includes a filter base, a filter housing and a filter cartridge within the housing. The filter cartridge strips water from the dirty fluid flowing through the assembly. The filter cartridge defines a pair of fluid flow paths extending through a central cavity thereof. The fluid flow paths carry and keep separated a flow of cleaned fluid after it passes through filter media of the cartridge as well as the water that has been stripped from the dirty fluid flow.

28 Claims, 11 Drawing Sheets

(56) References Cited

U.S. PATENT DOCUMENTS

| | | | |
|---|---|---|---|
| 5,102,541 A | 4/1992 | Breitbach | |
| 5,110,460 A | 5/1992 | Gilas | |
| 5,114,572 A | 5/1992 | Hunter et al. | |
| 5,203,994 A | 4/1993 | Janik | |
| 5,215,658 A | 6/1993 | Luby | |
| 5,259,953 A | 11/1993 | Baracchi et al. | |
| 5,302,284 A | 4/1994 | Zeiner et al. | |
| 5,339,787 A | 8/1994 | Jungquist et al. | |
| 5,342,511 A | 8/1994 | Brown et al. | |
| 5,350,506 A | 9/1994 | Dombek et al. | |
| 5,362,390 A | 11/1994 | Widenhoefer et al. | |
| 5,364,528 A | 11/1994 | Schwarz et al. | |
| 5,390,701 A | 2/1995 | Lessley et al. | |
| 5,462,658 A | 10/1995 | Sem | |
| 5,486,288 A | 1/1996 | Stanford et al. | |
| 5,560,824 A | 10/1996 | Sann et al. | |
| 5,674,393 A | 10/1997 | Terhune et al. | |
| 5,698,093 A | 12/1997 | Pyle et al. | |
| 5,744,030 A | 4/1998 | Reid et al. | |
| 5,766,468 A | 6/1998 | Brown et al. | |
| 5,788,859 A * | 8/1998 | Biere | 210/312 |
| 5,817,234 A | 10/1998 | Dye et al. | |
| 5,837,137 A | 11/1998 | Janik | |
| 5,868,932 A | 2/1999 | Guichaoua et al. | |
| 5,906,737 A | 5/1999 | Hoeppner | |
| 5,938,921 A | 8/1999 | Janik et al. | |
| 5,985,142 A | 11/1999 | Belden | |
| 5,988,399 A | 11/1999 | Brown et al. | |
| 6,048,455 A | 4/2000 | Janik | |
| 6,068,763 A | 5/2000 | Goddard | |
| 6,171,491 B1 | 1/2001 | Popoff et al. | |
| 6,187,188 B1 | 2/2001 | Janik et al. | |
| 6,189,513 B1 | 2/2001 | Brown et al. | |
| 6,193,884 B1 | 2/2001 | Magnusson et al. | |
| 6,207,052 B1 | 3/2001 | Webb | |
| 6,387,259 B1 | 5/2002 | Roll | |
| 6,428,700 B1 | 8/2002 | Brown et al. | |
| 6,471,070 B2 | 10/2002 | Janik | |
| 6,485,635 B1 | 11/2002 | Gandini et al. | |
| 6,488,845 B1 | 12/2002 | Neufeld et al. | |
| 6,495,042 B1 | 12/2002 | Knight | |
| 6,500,335 B2 | 12/2002 | Janik et al. | |
| 6,506,302 B2 | 1/2003 | Janik | |
| 6,517,717 B1 | 2/2003 | Håkansson | |
| D472,299 S | 3/2003 | Fritze | |
| D472,604 S | 4/2003 | Fritze | |
| 6,565,746 B1 | 5/2003 | Stamey, Jr. et al. | |
| 6,615,990 B1 | 9/2003 | Jokschas et al. | |
| 6,652,740 B2 | 11/2003 | Schoess | |
| 6,662,954 B2 | 12/2003 | Gottwald-Grill et al. | |
| 6,673,250 B2 | 1/2004 | Kuennen et al. | |
| 6,723,239 B2 | 4/2004 | Maxwell | |
| 6,740,234 B1 | 5/2004 | Williams et al. | |
| 6,863,811 B2 | 3/2005 | Janik | |
| 6,881,334 B2 | 4/2005 | Janik | |
| 6,896,803 B2 | 5/2005 | Cline et al. | |
| 6,926,156 B2 | 8/2005 | Wall | |
| 6,926,827 B2 | 8/2005 | Gruca et al. | |
| 6,977,006 B2 | 12/2005 | Reid | |
| 7,042,346 B2 | 5/2006 | Paulsen | |
| 7,048,488 B1 | 5/2006 | Kuznetsov et al. | |
| 7,070,692 B2 | 7/2006 | Knight | |
| 7,081,201 B2 | 7/2006 | Bassett et al. | |
| 7,390,407 B2 | 6/2008 | Weindorf et al. | |
| 7,744,758 B2 | 6/2010 | Dworatzek et al. | |
| 8,057,669 B2 | 11/2011 | Beard et al. | |
| 8,128,819 B2 | 3/2012 | Beard et al. | |
| 2002/0014452 A1 | 2/2002 | Janik | |
| 2002/0020660 A1 | 2/2002 | Jainek et al. | |
| 2002/0139731 A1 | 10/2002 | Michels et al. | |
| 2002/0166805 A1 | 11/2002 | Minns et al. | |
| 2002/0185454 A1 | 12/2002 | Beard et al. | |
| 2003/0019819 A1 | 1/2003 | Fritze | |
| 2003/0178354 A1 | 9/2003 | Wall | |
| 2003/0226800 A1 | 12/2003 | Brown et al. | |
| 2004/0144713 A1 | 7/2004 | Bassett et al. | |
| 2005/0056582 A1 | 3/2005 | Patel et al. | |
| 2005/0103692 A1 | 5/2005 | Stanhope et al. | |
| 2005/0161378 A1 | 7/2005 | Cline | |
| 2005/0161386 A1 | 7/2005 | Gustafson et al. | |
| 2005/0189288 A1 | 9/2005 | Hershberger et al. | |
| 2005/0194317 A1 | 9/2005 | Ikeyama et al. | |
| 2006/0016745 A1 | 1/2006 | Nguyen et al. | |
| 2006/0016769 A1 | 1/2006 | Hacker et al. | |
| 2006/0054547 A1 | 3/2006 | Richmond et al. | |
| 2006/0060512 A1 | 3/2006 | Astle et al. | |
| 2006/0096934 A1 | 5/2006 | Weinberger et al. | |
| 2006/0118475 A1 | 6/2006 | Girondi | |
| 2006/0124516 A1 | 6/2006 | Merritt et al. | |
| 2006/0151371 A1 | 7/2006 | Weinberger et al. | |
| 2006/0180539 A1 | 8/2006 | Wolf et al. | |
| 2006/0186031 A1 | 8/2006 | Fick et al. | |
| 2006/0191836 A1 | 8/2006 | Dworatzek et al. | |
| 2006/0219621 A1 | 10/2006 | Dworatzek | |
| 2006/0219626 A1 | 10/2006 | Dworatzek et al. | |
| 2007/0215561 A1 | 9/2007 | Yates et al. | |
| 2008/0035537 A1 | 2/2008 | Klein et al. | |
| 2008/0202081 A1 | 8/2008 | Schmid et al. | |
| 2008/0264850 A1 | 10/2008 | Amesoder et al. | |
| 2009/0014381 A1 | 1/2009 | South et al. | |
| 2009/0301949 A1 | 12/2009 | Kolczyk et al. | |
| 2009/0308801 A1 * | 12/2009 | Beard et al. | 210/234 |
| 2009/0308802 A1 | 12/2009 | Beard et al. | |
| 2009/0308803 A1 | 12/2009 | Beard et al. | |

FOREIGN PATENT DOCUMENTS

| | | |
|---|---|---|
| EP | 0 880 987 A1 | 12/1998 |
| EP | 1 124 056 A2 | 8/2001 |
| GB | 2 114 237 A | 8/1983 |
| JP | 55102916 U | 7/1980 |
| JP | 9-173717 A | 7/1997 |
| WO | WO 2007/053228 A2 | 5/2007 |

* cited by examiner

FILTER ASSEMBLY WITH WATER EVACUATION AND METHODS

FIELD OF THE INVENTION

This invention generally relates to fluid filters and more particularly relates to fluid filters that filter water from a dirty fluid.

BACKGROUND OF THE INVENTION

A filter assembly is used for removing impurities from a fluid flow. For instance, a filter assembly can be used for removing particulate matter or water from a fluid such as hydraulic fluid or fuel for use with engines or other machines. The removal of the impurities can prevent damage to downstream systems or improve performance thereof. One particular impurity in fuel or hydraulic fluid that can be problematic is the inclusion of water. Filter assemblies of the past have been configured to remove water from the fluid. Unfortunately, the stripped water can then just sit in the filter assembly. The present invention relates to improvements over the current state of the art and particularly improvements in handling water stripped from the fluid to be filtered.

BRIEF SUMMARY OF THE INVENTION

Embodiments of the invention relate to new and improved filter assemblies, filter cartridges for use in filter assemblies and methods of filtering a fluid. The invention generally relates to removal and handling of removed water from a hydraulic fluid or fuel.

In one embodiment, a filter cartridge for use in a reusable filter housing and for filtering dirty fluid supplied by a dirty fluid port of a filter base to which the filter cartridge and filter housing are releasably attachable is provided. The filter base includes a clean fluid port through which cleaned fluid exits and a return port through which separated water separated from the dirty fluid exits. The filter base also includes a dirty fluid port where dirty fluid is supplied to the filter cartridge when attached to the filter base.

The filter cartridge includes a tube of filter media, a first end cap portion, a dirty fluid inlet, a clean fluid outlet and a return outlet. The tube of filter media extends between first and second ends along a longitudinal axis and defines a central cavity. The first end cap portion is sealingly attached to the first end of the tube of filter media.

The first end cap portion carries the dirty fluid inlet which is defined by a dirty fluid inlet seal arrangement that fluidly seals with and fluidly communicates with the dirty fluid port of the filter base on an upstream side of the tube of filter media.

The clean fluid outlet is defined by a clean fluid outlet seal arrangement that fluidly seals with and fluidly communicates with the clean fluid port of the filter base on a downstream side of the tube of filter media. The tube of filter media is fluidly interposed between the dirty fluid inlet and the clean fluid outlet such that fluid flow through the clean fluid outlet must pass through the tube of filter media.

The return outlet is defined by a return outlet seal arrangement that fluidly seals with and fluidly communicates with the return port. Flow of separated water through the return outlet bypasses the tube of filter media and flows operably through the central cavity of the tube of filter media separated from both clean fluid and dirty fluid flows.

In one embodiment, the dirty fluid inlet seal arrangement includes a first radially inward directed seal and a first radially outward directed seal. The first radially outward directed seal has a smaller diameter than the first radially inward directed seal. The dirty fluid inlet is the gap formed between the first radially inward directed seal and the first radially outward directed seal of the dirty fluid inlet seal arrangement. The clean fluid inlet seal arrangement includes a second radially inward directed seal and the first radially outward directed seal. The second radially inward directed seal being positioned radially inward relative to the first radially outward directed seal. The clean fluid outlet is the gap formed between the first radially outward directed seal and the second radially inward directed seal. The return outlet seal arrangement is provided by the second radially inward directed seal.

In one embodiment, the dirty fluid inlet is spaced axially from the first end of the filter media along the longitudinal axis and is positioned, at least in part, radially inward from an outer diameter of the tube of filter media. The first end cap portion defines a radially outward directed flow passage that extends radially outward relative to the longitudinal axis when flowing in the downstream direction from the dirty fluid inlet.

In one embodiment, the radially outward directed flow passage is spaced axially from the first end of the tube of filter media, such that the first end of the tube of filter media is interposed axially along the longitudinal axis between the second end and the radially outward directed flow passage.

In one embodiment, the second radially inward directed seal and the first radially outward directed seal are provided by a single seal member, which may be in the form of a grommet axially secured to the first end cap portion. In one embodiment, the first radially inward directed seal is provided by a second seal member.

In one embodiment, the filter cartridge further includes a second radially outward directed seal proximate an outer radial periphery of the first end cap portion. The second radially outward directed seal is configured to seal with a radially inward directed seal surface of the filter housing to seal the filter cartridge within the filter housing.

In one embodiment, a return flow passage extends through the internal cavity of the tube of filter media. The return flow passage fluidly interposed between the dirty fluid inlet and the return outlet. Separated water passes through the return flow passage. A clean flow passage extends through the internal cavity from a downstream side of the tube of filter media to the clean fluid outlet. The clean flow passage is fluidly separated from the return flow passage.

The filter cartridge, in one embodiment, includes a second end cap portion attached to the second end of the tube of filter media. The second end cap portion includes a central aperture passing therethrough. The return flow passage fluidly communicates with an exterior of the tube of filter media through the central aperture.

In one embodiment, the filter cartridge further includes a centertube portion positioned within the internal cavity of the tube of filter media. The centertube portion includes a central passage providing the return flow passage. The central passage is in fluid communication with the exterior of the tube of filter media through the central aperture of the second end cap portion. In a more particular embodiment, the central passage of the centertube includes an inlet axially spaced apart from the return outlet. The inlet is spaced axially away from the second end of the tube of filter media with the inlet being positioned outside of the internal cavity of the tube of filter media.

In one embodiment, the centertube portion includes a second fluid passage radially spaced from the central passage. The second fluid passage provides the clean flow passage.

The second fluid passage has an inlet within the central cavity of the tube of filter media and axially between the first and second ends and fluidly communicates with the clean fluid outlet through the second fluid passage.

In one embodiment, the inlet of the second fluid passage is positioned axially along the longitudinal axis closer to the second end of the tube of filter media than the first end of the tube of filter media.

In one embodiment, the centertube includes an axially extending tubular portion that extends axially through the central aperture of the second end cap portion. The distal end of the axially extending tubular portion defines the inlet of the central passage.

In another embodiment, a filter cartridge for use in a reusable filter housing is provided. The filter cartridge is used for filtering dirty fluid supplied by a dirty fluid port of a filter base to which the filter cartridge and filter housing are releasably attachable. The filter base also includes a clean fluid port through which cleaned fluid exits and a return port through which separated water exits. The filter cartridge includes a tube of filter media extending between first and second ends along a longitudinal axis and defining a central cavity. A dirty fluid inlet seals with and fluidly communicates with the dirty fluid port of the filter base on an upstream side of the tube of filter media. A clean fluid outlet that seals with and fluidly communicates with the clean fluid port on a downstream side of the tube of filter media. The tube of filter media is fluidly interposed between the dirty fluid inlet and the clean fluid outlet such that fluid flow through the clean fluid outlet must pass through the tube of filter media. A return outlet seals with and fluidly communicates with the return port. Fluid flow through the return outlet bypasses the tube of filter media.

A filter assembly is also provided in one embodiment. The filter assembly includes a filter base, a filter housing and a filter cartridge. The filter base includes a dirty fluid port, a clean fluid port and a return port. The filter housing is removably attachable to the filter base and defines an internal cavity. The filter cartridge is removably positioned within the internal cavity of the filter housing. The filter cartridge includes a tube of filter media, a dirty fluid inlet, a clean fluid outlet and a return outlet. The tube of filter media extends between first and second ends along a longitudinal axis and defines a central cavity. The dirty fluid inlet seals with and fluidly communicates with the dirty fluid port of the filter base on an upstream side of the tube of filter media. The clean fluid outlet seals with and fluidly communicates with the clean fluid port on a downstream side of the tube of filter media. The return outlet seals with and fluidly communicates with the return port. The filter cartridge and filter housing define a sump region therebetween that is downstream from the tube of filter media and upstream of the return outlet when the filter cartridge is mounted within the filter housing. The return outlet is in fluid communication with the sump region when the filter cartridge is mounted within the filter housing. The sump region collects water separated from dirty fluid prior to the dirty fluid passing through the tube of filter media.

In one embodiment, the filter base, filter housing and filter cartridge are configured such that the sump region is generally vertically below the filter cartridge when the filter assembly is assembled.

A further filter assembly is provided. The filter assembly includes a filter base, a filter housing and a filter cartridge. The filter base includes a first generally tubular portion extending axially along a longitudinal axis defining a first radially outward directed sealing surface and a first radially inward directed sealing surface having a smaller diameter than the first radially outward directed sealing surface. The first generally tubular portion defines a dirty fluid port positioned radially between the first radially outward directed sealing surface and the first radially inward directed sealing surface. The filter base includes a second generally tubular portion extending axially along the longitudinal axis defining a second radially outward directed sealing surface having an outer diameter that is less than the diameter of the first radially inward directed sealing surface and which defines a central channel. The central channel forms a return port. A clean fluid port is formed between the first radially inward directed sealing surface and the second radially outward directed sealing surface.

The filter housing is removably attached to the filter base defining an internal cavity.

The filter cartridge is removably positioned within the internal cavity of the filter housing. The filter cartridge includes a tube of filter media, a dirty fluid inlet, a clean fluid outlet and a return outlet. The tube of filter media extends between first and second ends along the longitudinal axis that is parallel to the longitudinal axis and defining a central cavity. The dirty fluid inlet seals with and fluidly communicates with the dirty fluid port of the filter base on an upstream side of the tube of filter media. The clean fluid outlet seals with and fluidly communicates with the clean fluid port on a downstream side of the tube of filter media. The return outlet seals with and fluidly communicates with the return port. The filter cartridge and filter housing define a sump region therebetween that is downstream from the tube of filter media and upstream of the return outlet. The sump region collects water separated from dirty fluid external of the tube of filter media. The return outlet is in fluid communication with the sump region through the central cavity of the tube of filter media.

In a further embodiment, a filter assembly is provided. The filter assembly includes a filter base, a filter housing and a filter cartridge. The filter base includes a first generally tubular portion extending axially along a longitudinal axis defining a first radially outward directed sealing surface and a first radially inward directed sealing surface having a smaller diameter than the first radially outward directed sealing surface. The first generally tubular portion defines a dirty fluid port positioned radially between the first radially outward directed sealing surface and the first radially inward directed sealing surface. The filter base also includes a second generally tubular portion extending axially along the longitudinal axis defining a second radially outward directed sealing surface having an outer diameter that is less than the diameter of the first radially inward directed sealing surface and defines a central channel. The central channel forms a return port. A clean fluid port is formed between the first radially inward directed sealing surface and the second radially outward directed sealing surface.

The filter housing is removably attached to the filter base and defines an internal cavity.

The filter cartridge is removably positioned within the internal cavity of the filter housing, the filter cartridge includes a tube of filter media extending between first and second ends along the longitudinal axis and defines a central cavity.

A first end cap portion is sealingly attached to the first end of the tube of filter media. The first end cap portion carries a dirty fluid inlet, a clean fluid outlet and a return outlet.

The dirty fluid inlet is defined by a dirty fluid inlet seal arrangement that fluidly seals with the first radially outward directed sealing surface and the first radially inward directed sealing surface. The dirty fluid inlet fluidly communicates with the dirty fluid port of the filter base on an upstream side of the tube of filter media.

The clean fluid outlet is defined by a clean fluid outlet seal arrangement that fluidly seals with first radially inward directed sealing surface and the second radially outward directed sealing surface. The clean fluid outlet fluidly communicates with the clean fluid port of the filter base on a downstream side of the tube of filter media. The tube of filter media is fluidly interposed between the dirty fluid inlet and the clean fluid outlet such that fluid flow through the clean fluid outlet must pass through the tube of filter media.

The return outlet is defined by a return outlet seal arrangement that fluidly seals with the second radially outward directed sealing surface. The return outlet fluidly communicates with the return port.

The filter cartridge and filter housing define a sump region therebetween that is downstream from the tube of filter media and upstream of the return outlet. The sump region collects water separated from dirty fluid external of the tube of filter media. The return outlet is in fluid communication with the sump region through the central cavity of the tube of filter media.

In one embodiment, a method of filtering a fluid is provided. The method includes:
receiving a dirty fluid at an inlet port of a filter base; separating water from the dirty fluid prior to the dirty fluid passing into a central cavity of a tube of filter media of a filter cartridge attached to the filter base; passing the water to a sump region formed between the filter cartridge and a filter housing in which the filter cartridge is positioned; passing the dirty fluid through the tube of filter media to remove particulate from the dirty fluid and converting the dirty fluid into clean fluid; passing the clean fluid through a clean fluid flow path that has an inlet within the central cavity of the tube of filter media; expelling the clean fluid from the clean fluid flow path through a clean fluid outlet of the filter cartridge; passing the water through a return flow passage that extends through the central cavity of the tube of filter media; and expelling the clean water through a return outlet of the filter cartridge.

In a further embodiment, the water enters the return flow passage through an inlet of the return flow passage that is positioned axially outside of the central cavity of the tube of filter media.

In a further embodiment, the method further includes replacing the filter cartridge with a new filter cartridge that includes replacing the return flow passage while replacing the filter cartridge.

Embodiments of the filter assemblies and methods utilize filter cartridges as defined above, where appropriate.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
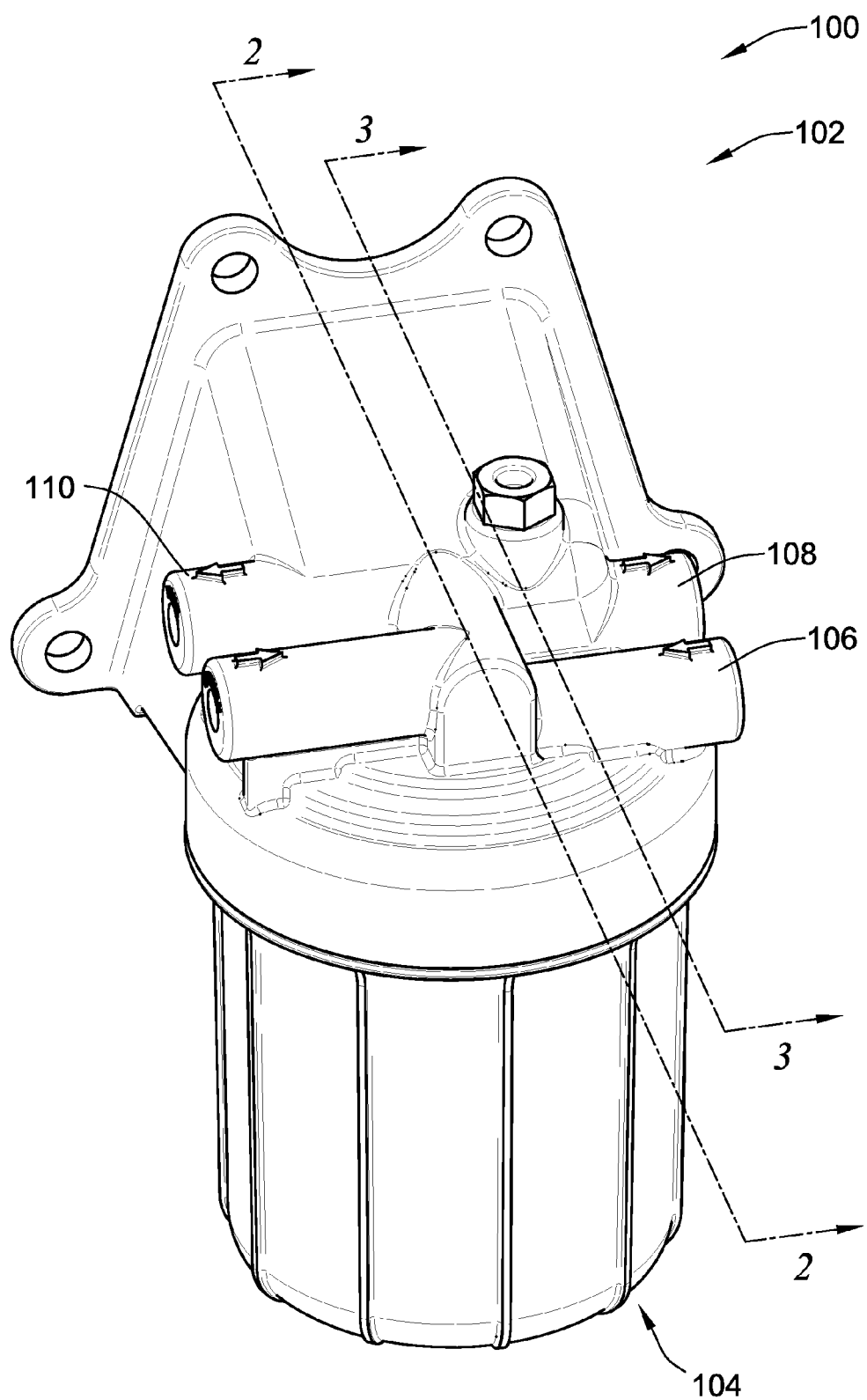
FIG. 1 is a top perspective view of a filter assembly according to an embodiment of the present invention.

FIG. 1 illustrates a filter assembly 100 according to an embodiment of the present invention. The filter assembly 100 generally includes a filter base 102 to which a filter housing 104 is releasably secured. The filter base 102 includes a plurality of inlet and outlet ports for various functions. For instance, the ports can be used for receiving dirty fluid, expelling clean fluid, returning separated water from a dirty fluid to a storage tank or drain, as well as return line ports for excess fluid. In the illustrated embodiment, the dirty fluid port 106 and the clean fluid port 108 are on the same side of the filter base 102. The return port 110 is illustrated in FIG. 2.

Figure 2:
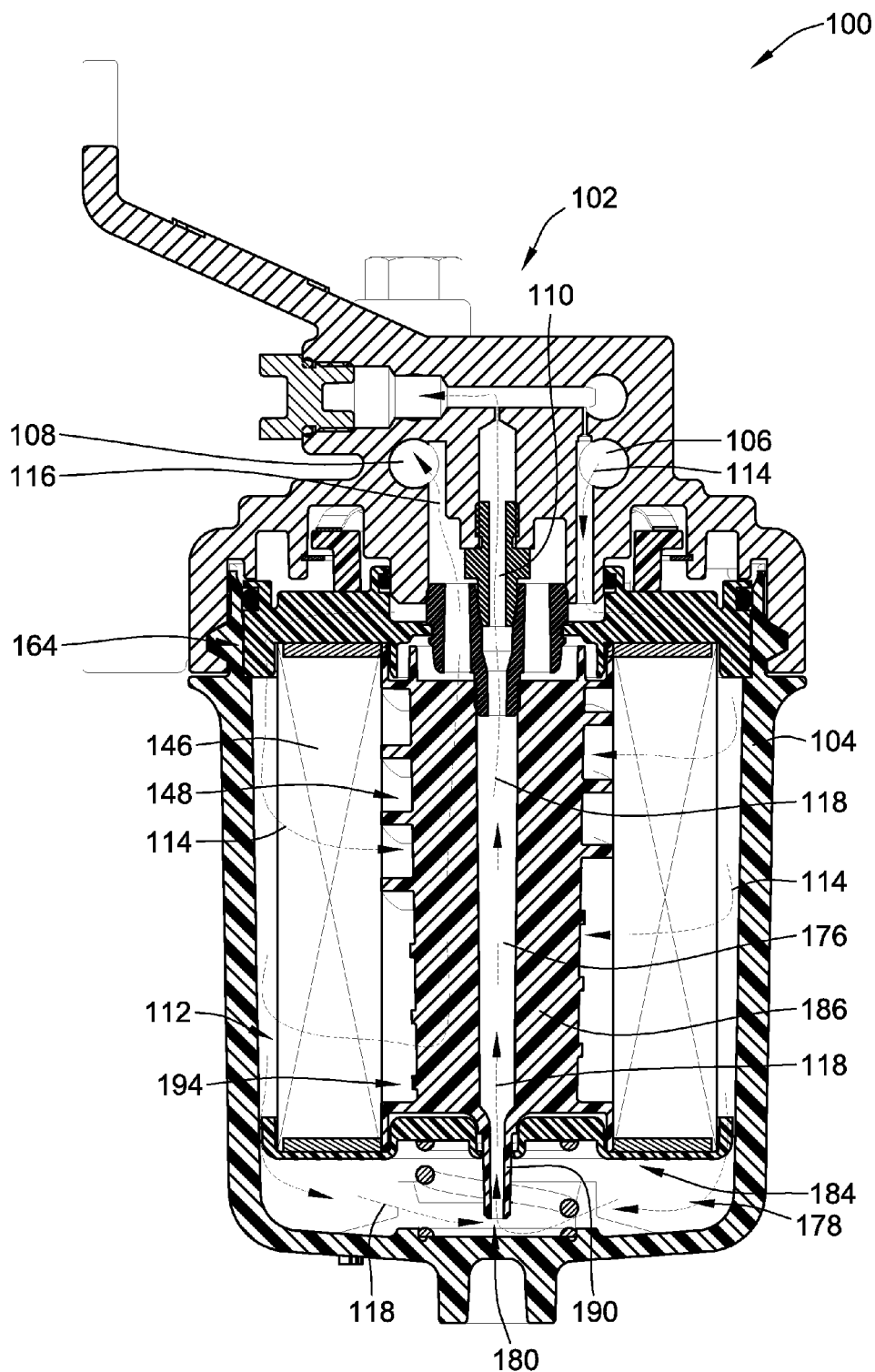
FIG. 2 is a cross-sectional illustration of the filter assembly of FIG. 1 taken about line 2-2.
Figure 3:
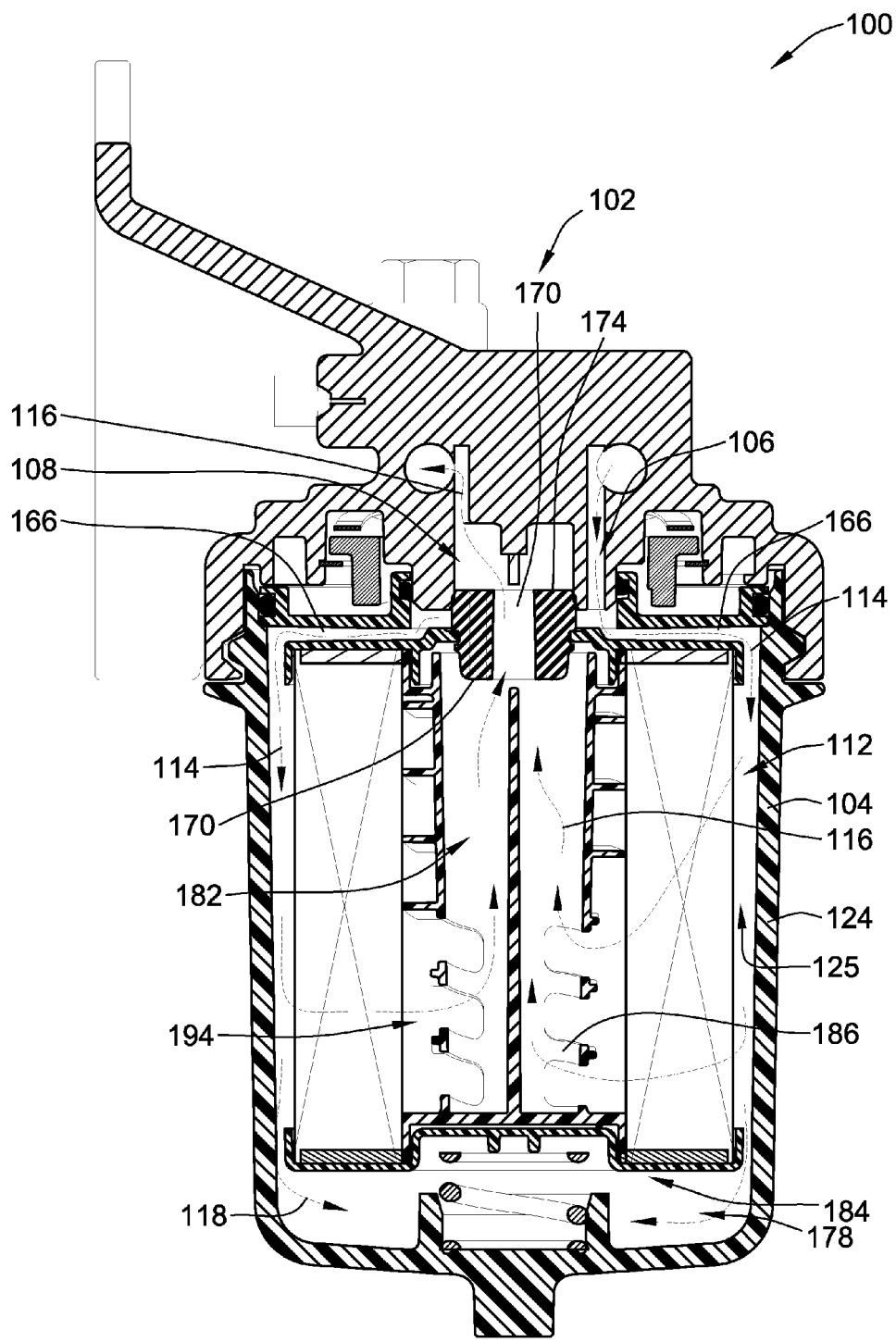
FIG. 3 is a cross-sectional illustration of the filter assembly of FIG. 1 taken about line 3-3.

With reference to FIGS. 2 and 3, filter assembly 100 also includes a replaceable filter cartridge 112 that is used to clean fluid flowing through the filter assembly 100. The filter cartridge 112 is preferably configured to remove both particulate impurities within the fluid flow, as well as to strip or separate water from the fluid flow flowing from the dirty fluid port 106 to the clean fluid port 108. The flow of fluid between these two ports is illustrated by arrows 114, 116. Arrows 114 illustrate dirty fluid, while arrows 116 illustrate clean fluid that has passed through filter media of the filter cartridge 112. Arrows 118 illustrate water or other impurities that have been separated from the dirty fluid 114. In some implementations, the water that is separated from the dirty fluid is returned back to the storage tank such as a fuel storage tank or hydraulic fluid storage tank, where it can then be removed therefrom at a later date. Alternatively, the separated water can be drained directly from the system or sent to a separate storage tank for that separated water.

Figure 4:
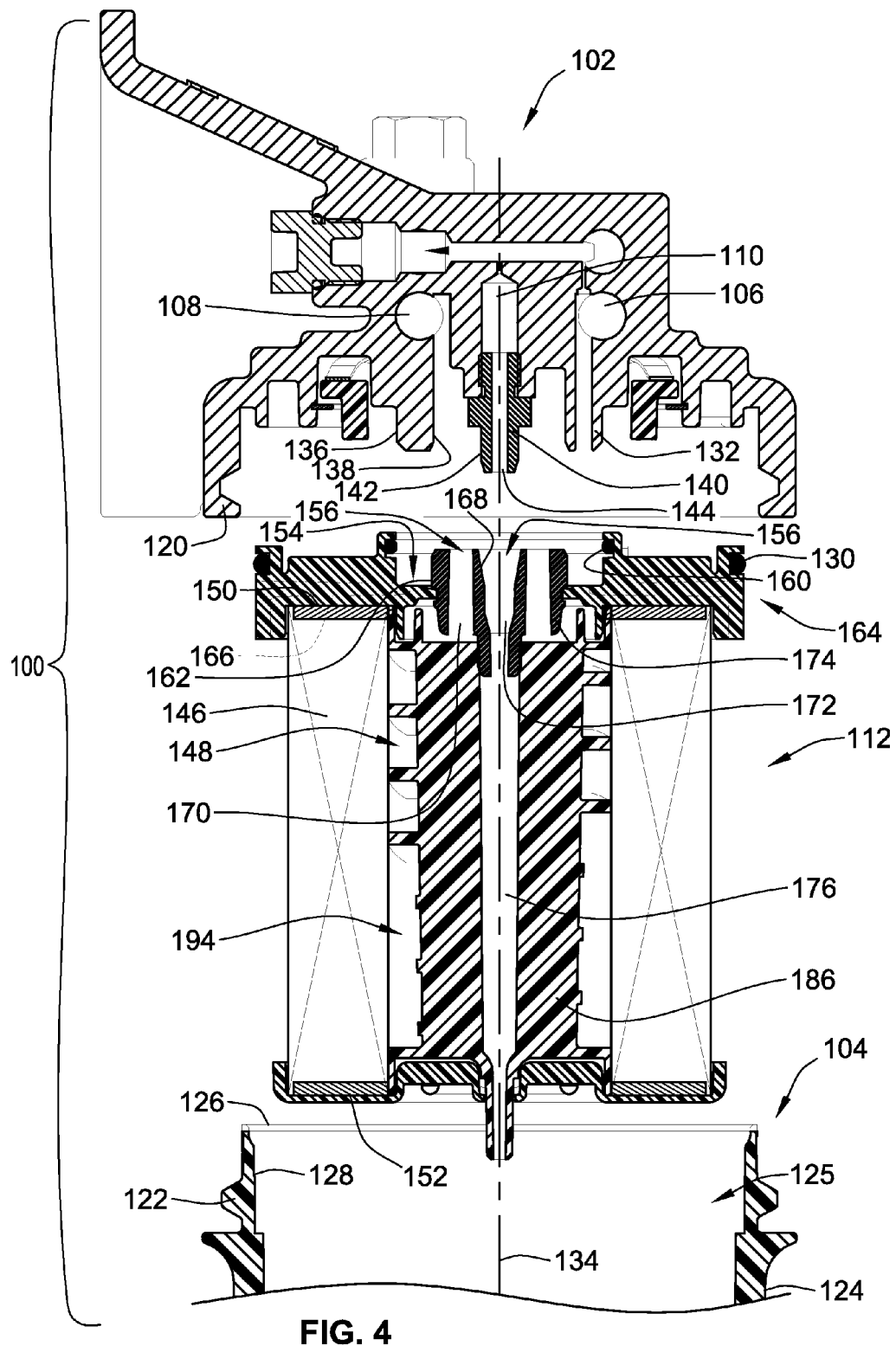
FIG. 4 is an exploded cross-sectional illustration of FIG. 2.

With reference to FIG. 4, the filter base 102 includes a first set of threads 120 that cooperate with a second set of threads 122 of the filter housing 104 to releasably secure the filter housing 104 to the filter base 102 and allow for replacement of filter cartridge 112 at maintenance intervals.

The filter housing 104 is generally bowl or cup shaped including an annular sidewall 124 that generally defines an internal cavity 125. The annular sidewall 124 terminates in a distal end 126 that forms an open end of the filter housing 104 for receipt of the filter cartridge 112 therein. The filter housing 104 is generally closed at the end opposite distal end 126. Proximate the distal end 126, the annular sidewall 124 defines a radially inward directed sealing surface 128 that cooperates with a radially outward directed seal member 130 of the filter cartridge 112 to seal the filter cartridge 112 within the filter housing 104 (see also FIG. 5).

With reference to FIG. 4, the filter base 102 generally includes a first generally tubular portion 132 that extends axially along longitudinal axis 134. The first generally tubular portion defines a first radially outward directed sealing surface 136, as well as a first radially inward directed sealing surface 138 having a smaller inner diameter than the outer diameter of the first radially outward directed sealing surface 136. These two surfaces 136, 138 are preferably generally concentric about longitudinal axis 134. The dirty fluid port 106 is, at least in part, formed radially between the first radially outward directed sealing surface 136 and the first radially inward directed sealing surface 138. In the illustrated embodiment, this portion of the dirty fluid port 106 is formed by a single axially extending passage formed in the first generally tubular portion 132. However, in alternative embodiments it could be formed by a plurality of passages. Further, the passage need not necessarily be axially extending as it exits the first generally tubular portion 132, but could exit in a radial direction in alternative embodiments.

The filter base 102 further includes a second generally tubular portion 140 that extends axially along the longitudinal axis 134. The second generally tubular portion 140 defines a second radially outward directed sealing surface 142. The second radially outward directed sealing surface 142 that has an outer diameter that is generally less than the inner diameter of the first radially inward directed sealing surface 138. The second generally tubular portion 140 also defines a central channel 144 that forms, at least part of, the return port 110. The clean fluid port 108 is formed, at least in part, between the first radially inward directed sealing surface 138 and the second radially outward directed sealing surface 142.

When the filter cartridge 112 is inserted into the filter housing 104, the filter cartridge 112 and filter housing 104 are operably attachable to the filter base 102 in such a manner that the filter cartridge 112 is interposed between the dirty fluid port 106 and clean fluid port 108 so as to filter the fluid flowing therethrough.

Figure 5:
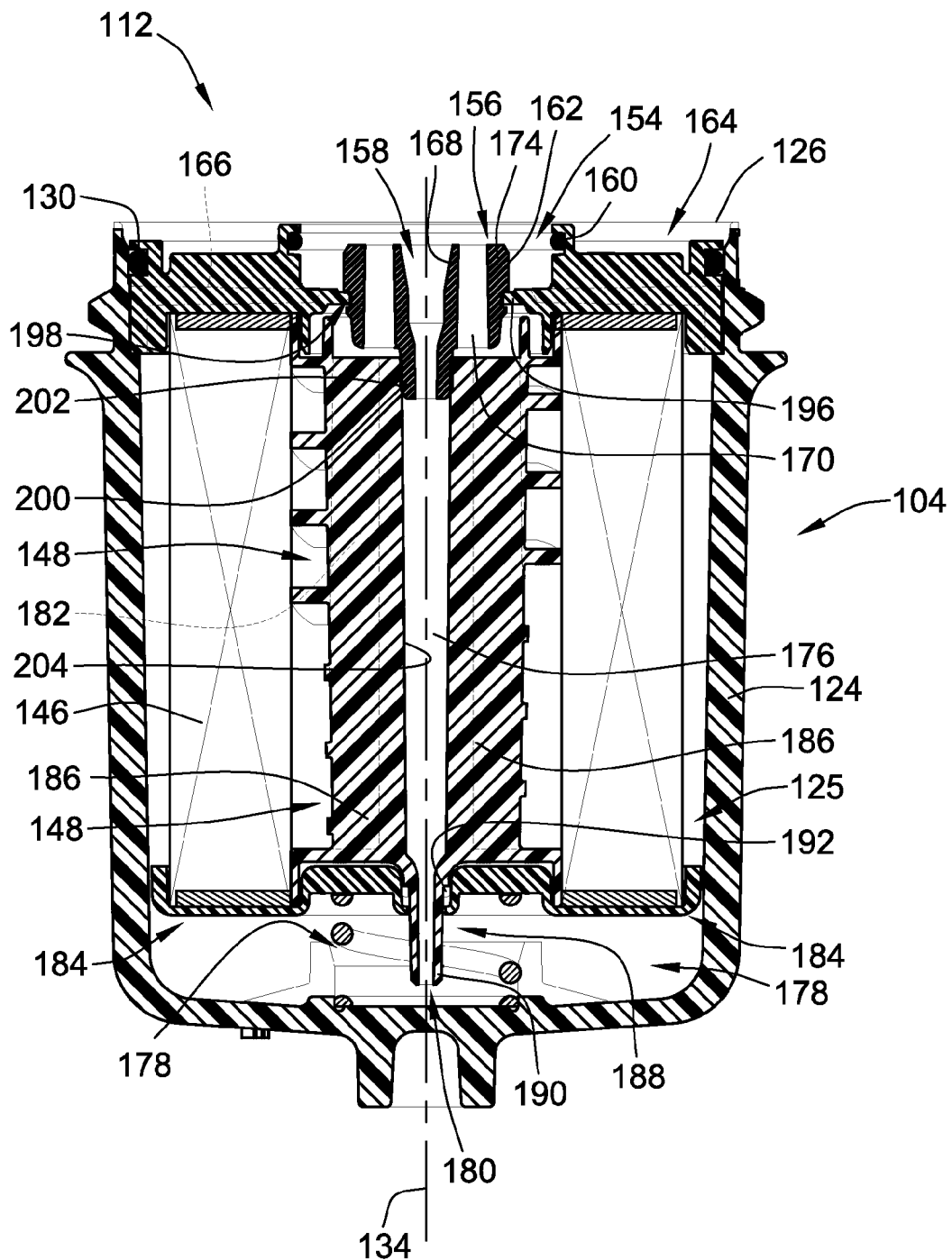
FIG. 5 is a cross-sectional illustration of the filter housing and filter cartridge of FIG. 2.

With reference to FIGS. 4 and 5, filter cartridge 112 includes an axially extending tube of filter media 146 that is generally concentric with longitudinal axis 134 and that defines central cavity 148. The tube of filter media 146 extends longitudinally between a first end 150 and a second end 152.

The filter cartridge 112 includes a dirty fluid inlet 154, a clean fluid outlet 156, and a return outlet 158.

The dirty fluid inlet 154 seals with and fluidly communicates with the dirty fluid port 106 of the filter base 102 on an upstream side of the tube of filter media 146. The dirty fluid inlet 154 is generally formed in the illustrated embodiment by a dirty fluid inlet seal arrangement that operably fluidly seals with and fluidly communicates with the dirty fluid port 106. The dirty fluid inlet seal arrangement includes a first radially inward directed seal 160 and a first radially outward seal 162. The first radially outward directed seal 162 has a smaller diameter than the first radially inward directed seal 160. The dirty fluid inlet 154 is generally the annular gap formed radially between the first radially inward directed seal 160 and the first radially outward directed seal 162. The first radially inward directed seal 160 operably seals on the first radially outward directed seal surface 136 of the first generally tubular portion 132 of the filter base 102 when assembled. Additionally, the first radially outward seal 162 operably seals on the first radially inward directed sealing surface 138 of the first generally tubular portion 132. This arrangement allows the dirty fluid port 106 to operably communicate with the upstream side, i.e. the outer periphery of the tube of filter media 146.

The filter cartridge 112 further includes a first end cap portion 164 that is sealing attached to the first end 150 of the tube of filter media 146. The first end cap portion 164 defines a radially outward directed flow passage 166 (see also FIG. 3) that extends radially outward relative to the longitudinal axis 134 and allows dirty fluid 114 to flow radially outward relative to longitudinal axis 134 when flowing in a downstream direction from the dirty fluid inlet 154. The dirty fluid inlet 154 is generally axially spaced from the first end 150 of the tube of filter media 146 along the longitudinal axis 134 and is positioned, at least in part, radially inward from an outer diameter of the tube of filter media 146. The radially outward directed flow passage 166 permits the dirty fluid to flow radially outward from the dirty fluid inlet 154 to the outer periphery of the tube of filter media 146 such that it can then be filtered by passing through the filter media 146 by flowing radially inward.

The clean fluid outlet 156 is defined by a clean fluid outlet seal arrangement that fluidly seals with and fluidly communicates with the clean fluid port 108 of the filter base 102 on a downstream side of the tube of filter media 146 when assembled. As such, the tube of filter media 146 is fluidly interposed between the dirty fluid inlet 154 and the clean fluid outlet 156 such that fluid flow through the clean fluid outlet 156 must previously pass through the tube of filter media 146.

The clean fluid outlet seal arrangement includes a second radially inward directed seal 168, as well as uses the first radially outward directed seal 162. The second radially inward directed seal 168 is positioned radially inward relative to the first radially outward directed seal 162. The clean fluid outlet 156 is the fluid flow passage or gap 170 formed between the first radially outward directed seal 162 and the second radially inward directed seal 168.

The first radially outward directed seal 162 seals with the first radially inward directed sealing surface 138 of the generally tubular portion 132. The second radially inward directed seal 168 seals with the second radially outward directed sealing surface 142 of the second generally tubular portion 140. As such, the fluid flow passage or gap 170 formed by the clean fluid outlet seal arrangement operably communicates with the annular gap formed between the first radially inward directed sealing surface 138 and the second radially outward directed sealing surface 142 which forms part of the clean fluid port 108 of the filter base 102. The clean fluid outlet seal arrangement is also carried by the first end cap portion 164 of the filter cartridge 112.

The return outlet 158 is defined by a return outlet seal arrangement that operably fluidly seals with and fluidly communicates with the return port 110 of the filter base 102. This communication allows the flow of separated water 118 that has been separated from the dirty fluid to exit the filter housing 104 and pass into the return outlet 110 with this separated water bypassing the tube of filter media 146. The return outlet seal arrangement is provided by the second radially inward directed seal 168. The return outlet 158 is the flow path 172 generally bounded by the second radially inward directed seal 168. The return outlet seal arrangement is also carried by the first end cap portion 164.

It is noted that surfaces 136, 138, 142 are generally defined as radially inward or outward directed sealing surfaces. However, these surfaces may have either a slight slant or chamfer relative to the longitudinal axis 134 so as to facilitate mating engagement with the filter cartridge 112. Further, these surfaces may include a lead in chamfer such as illustrated in the present embodiment. However, these surfaces will still be considered to be generally radially outward or inward directed sealing surfaces. Similarly, the radially inward and outward directed seals 160, 162, 168 may have chamfers or slants relative to the longitudinal axis 134 so as to similarly facilitate mating engagement with the first and second generally tubular portions 132, 140 when the filter cartridge 112 and filter housing 104 are mounted to the filter base 102. But, again, these surfaces will generally be considered radially directed.

In the illustrated embodiment, the first radially inward directed seal 160 is provided by its own seal member in the form of an O-ring. The first radially outward directed seal 162 and the second radially inward directed seal 168 are provided by a single seal member 174.

The radially outward directed seal 130 identified above that seals with radially inward directed sealing surface 128 of the filter housing 104 in the illustrated embodiment is carried by the first end cap portion 164 at an outer periphery thereof and is illustrated as an O-ring.

The filter cartridge 112 generally defines a return flow passage 176 that extends through the central cavity 148 of the tube of filter media 146. The return flow passage 176 is operably fluidly interposed between the dirty fluid inlet 154 and the return outlet 158 when. Water that is separated from the dirty fluid 114 can pass through the return flow passage 176 to the return outlet 158.

With reference to FIG. 5, when the filter cartridge 112 is inserted into the filter housing 104, the filter cartridge 112 and the filter housing 104 define a sump region 178 where the separated water 118 will gather after being removed or stripped from the dirty fluid 114. The water will pass into the return flow passage 176 through an inlet 180 of the return flow passage 176. Sump region 178 is preferably gravitationally below filter cartridge 112. As such, when in operation, and the filter cartridge 112 is operably mounted to filter base 102, the first end cap portion 164 is vertically above second end cap portion 184 and inlet 180 of the return flow passage 176.

The filter cartridge 112 also defines a clean flow passage 182 that also passes through the central cavity 148 of the tube of filter media 146. The clean flow passage 182 extends from a downstream side (i.e. a radially inward side) of the tube of filter media 146 to the clean fluid outlet 156. The filter cartridge 112 is configured such that the clean flow passage 182 and the return flow passage 176 are fluidly separated from one another within the central cavity 148 of the tube of filter media 146 such that the two fluid flows therethrough do not mix.

The filter cartridge 112 further includes a second end cap portion 184, as well as a centertube 186. The second end cap portion 184 is sealingly attached to the second end 152 of the tube of filter media 146. The centertube 186 is generally positioned within the central cavity 148 of the tube of filter media 146 and extends generally axially along the longitudinal axis 134. The second end cap portion 184 includes a central aperture 188 that passes therethrough. The central aperture 188 allows communication of the exterior of the filter cartridge 112 with the central cavity 148 of the tube of filter media 146. The return flow passage 176 of the filter cartridge 112 fluidly communicates with the exterior of the tube of filter media 146 through the central aperture 188.

The return flow passage 176 is defined, in the illustrated embodiment, by the centertube 186 which includes a central passage that defines the return flow passage 176. The centertube 186 includes an axially extending tubular portion 190 that extends axially through the central aperture 188 of the second end cap portion 184. The distal end of the axially extending tubular portion 190 generally defines the inlet 180 of the central passage of the centertube, as well as the inlet of the return flow passage 176. The inlet 180 is axially spaced apart from the return outlet 158. Inlet 180 is also axially spaced away from the second end 152 of the tube of filter media 146 such that the inlet 180 is positioned outside of the central cavity 148 of the tube of filter media 146. More particularly, the second end 152 of the tube of filter media 146 is interposed axially along longitudinal axis 134 between the first end 150 and the inlet 180.

A seal member 192 provides a seal between the second end cap portion 184 and the centertube 186. In alternative embodiments, the second end cap portion 184 and centertube 186 could be formed by a single one-piece component and the seal 192 could be eliminated.

The clean flow passage 182 is also formed, at least in part, by the centertube 186. The clean flow passage 182 is radially spaced from the return flow passage 176 provided by the central passage of the centertube 186. The clean flow passage 182 has an inlet region 194 (see also FIGS. 6 and 7) that is positioned within the central cavity 148 of the tube of filter media 146. The clean flow passage 182 fluidly communicates the inlet region 194 with the clean fluid outlet 156. Preferably, the inlet region 194 of the clean flow passage 182 is positioned axially along the longitudinal axis 134 closer to the second end 152 of the tube of filter media than the first end 150 of the tube of filter media 146. This assists in keeping the inlet region 194 submersed in fluid and assists in avoiding a loss in prime or restart after prime has been lost.

With reference to FIG. 5, seal member 174 sealing engages a radially directed flange portion 196 of the first end cap portion 164. The seal member 174 is in the form of a grommet in that it includes annular groove 198 that has a radially outward directed mouth that forms an undercut which receives the radially directed flange portion 196 so as to mechanically locate the seal member 174 relative to the first end cap portion 164. The seal member 174 extends through the aperture that is defined by the radially directed flange portion 196 of the first end cap 164. The seal member 174 includes a reduced diameter axially extending tubular portion 200 that defines a radially outward directed sealing surface 202. The axially extending tubular portion 200 is axially received within the return flow passage 176 of the centertube 186. The radially outward directed sealing surface 202 radially seals with the inner surface 204 of the centertube 186 that defines the return flow passage 176. This seal prevents clean fluid or separated water from bypassing the engagement between the seal member 174 and the centertube 186.

Figure 8:
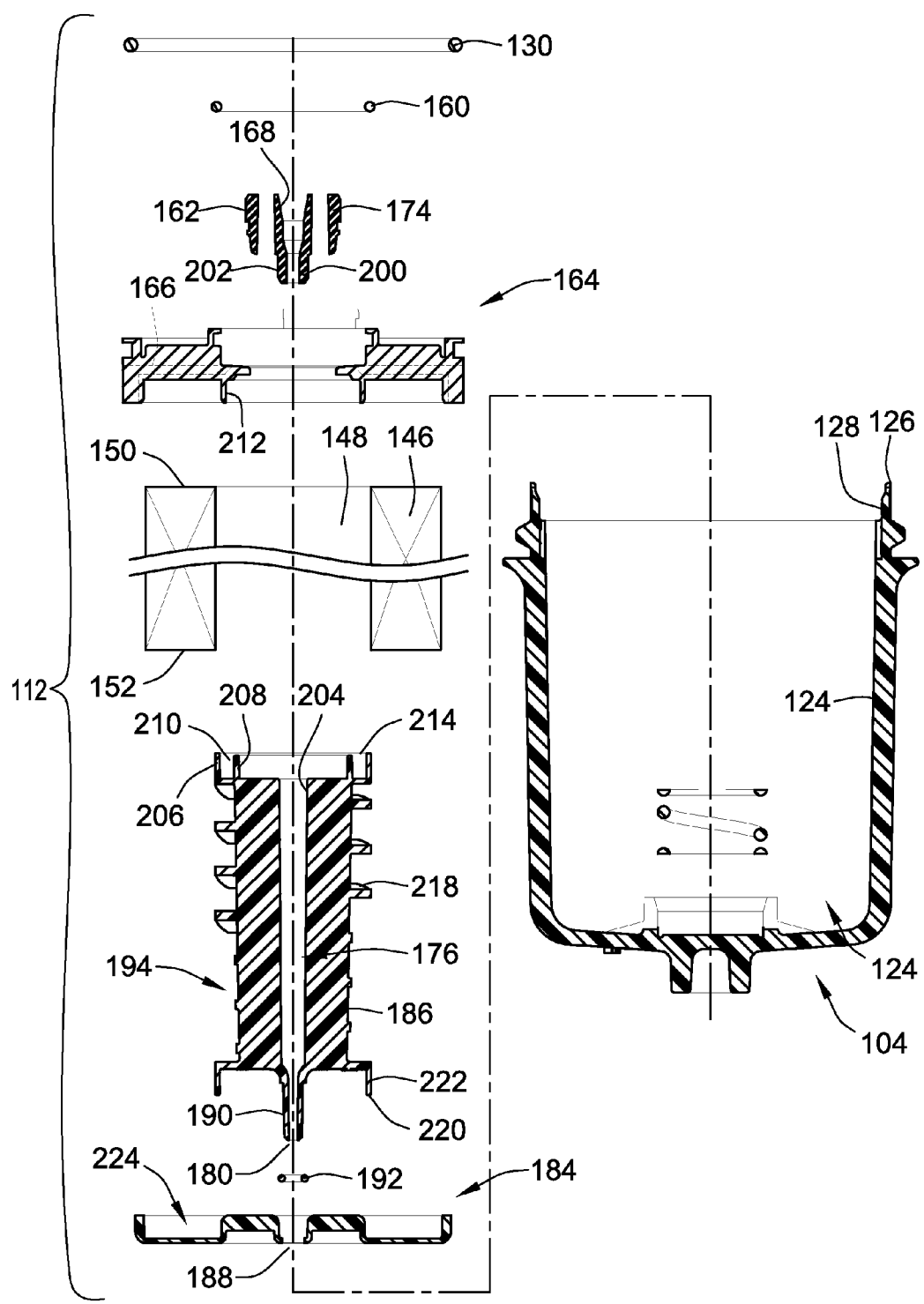
FIG. 8 is an exploded cross-sectional illustration of the filter cartridge and filter housing of FIG. 5.
Figure 9:
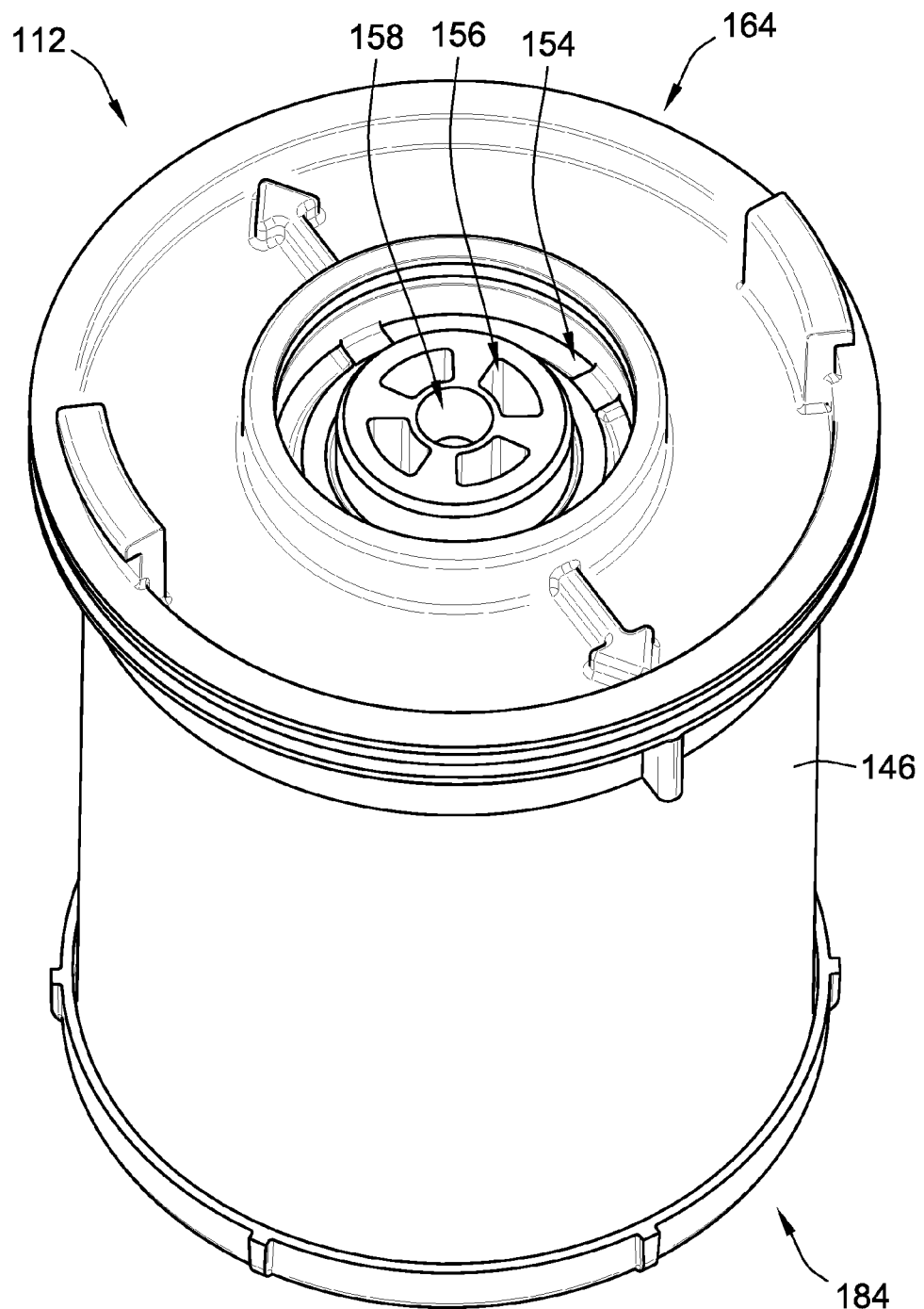
FIG. 9 is a top perspective illustration of the filter cartridge.
Figure 10:
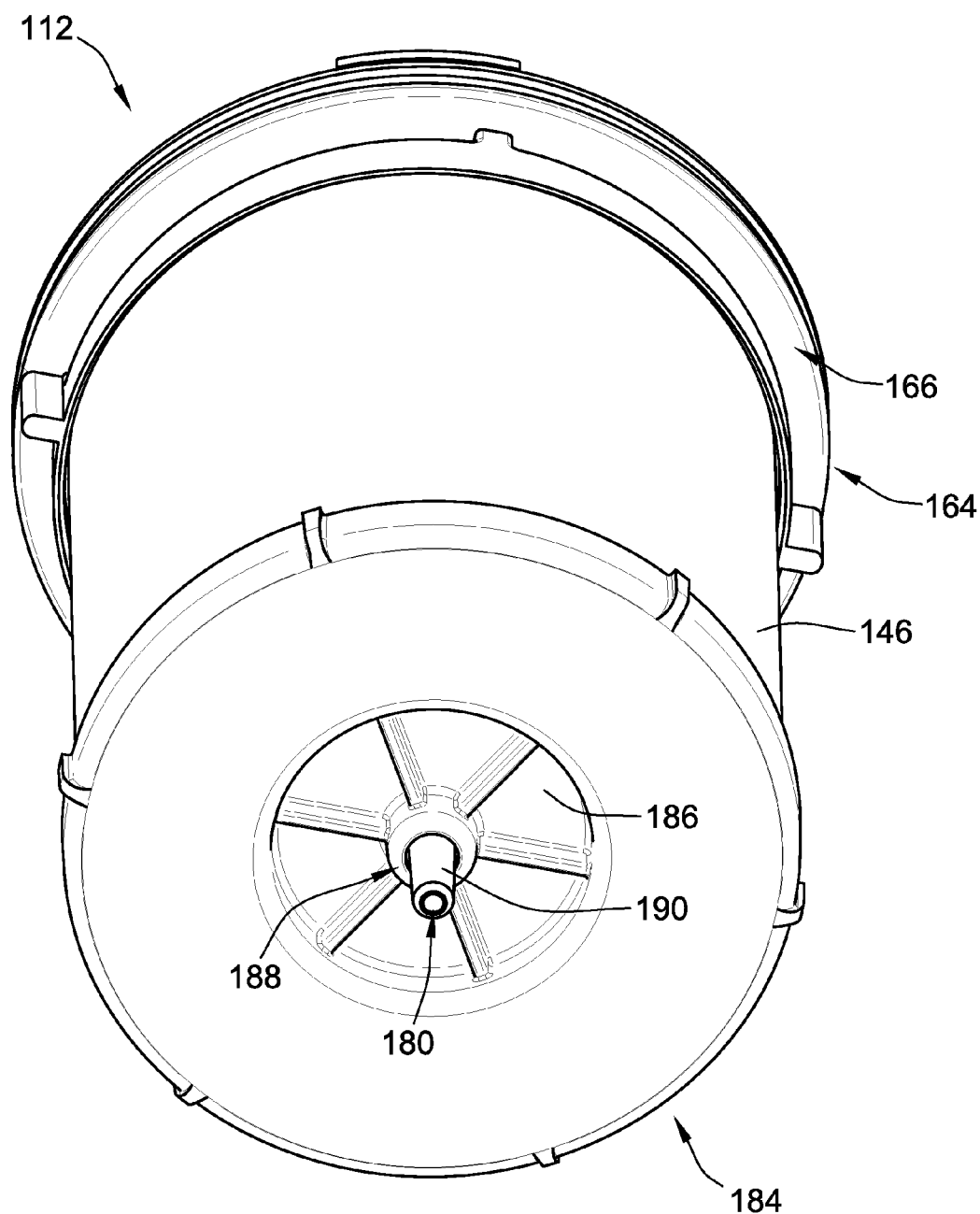
FIG. 10 is a bottom perspective illustration of the filter cartridge.
Figure 11:
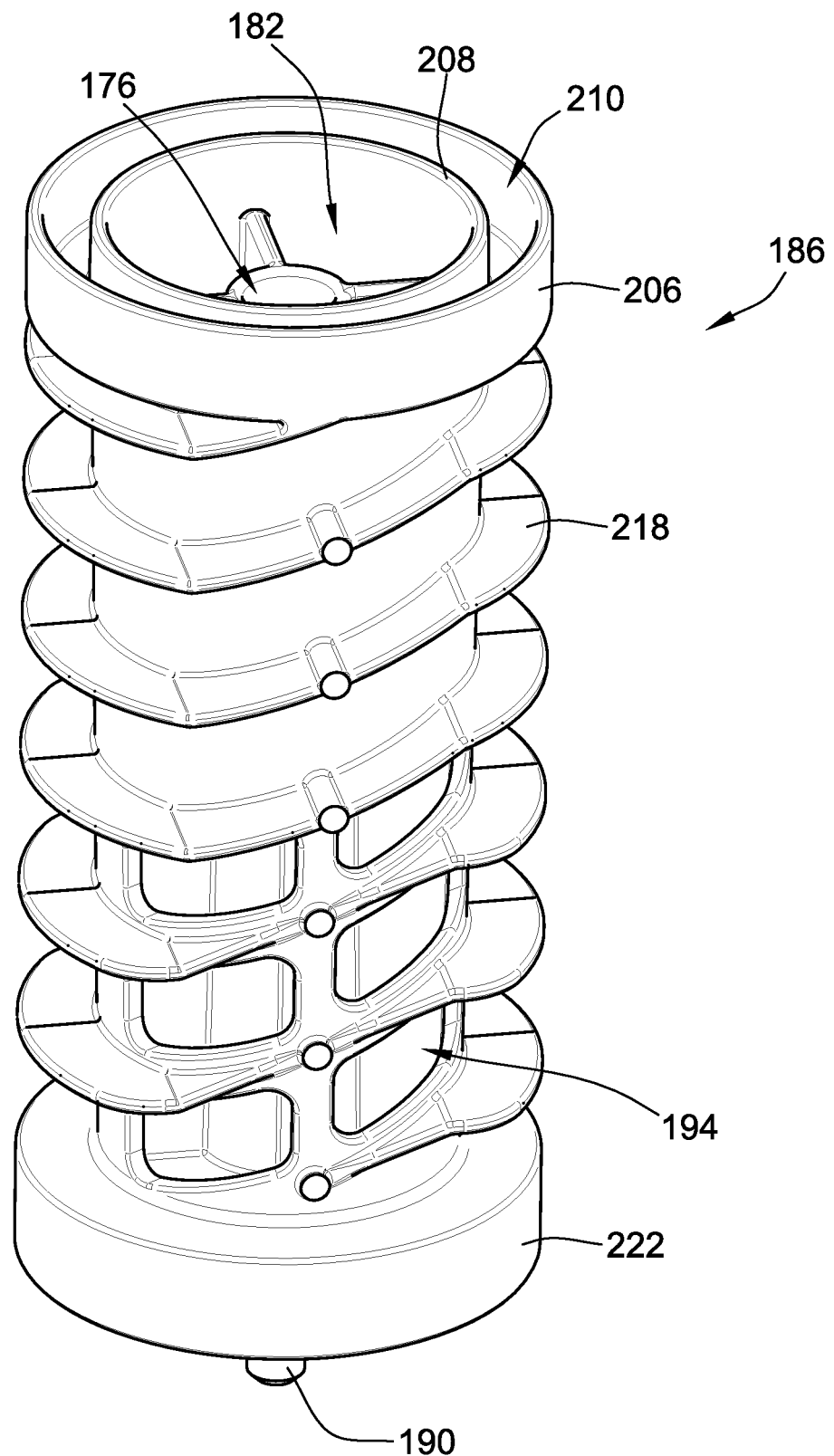
FIG. 11 is a top perspective illustration of the centertube of the filter cartridge.

With reference to FIG. 8, the centertube 186 includes a pair of parallel concentric axially extending walls 206, 208 that defines an annular channel 210 therebetween. The first end cap portion 164 includes an axially extending wall 212 that is axially received in the channel 210 and between the pair of walls 206, 208 of the centertube 186 when the filter cartridge 112 is fully assembled and adhesive may be positioned between the centertube 186 and the first end cap portion 164 to provide a seal between the first end 214 of the centertube and the first end cap portion 164. Alternatively, the first end cap portion 164 may be formed with the centertube 186 as a one-piece component. Further, the first end 214 of the centertube 186 could be embedded in the first end cap portion 164 or otherwise ultrasonically welded to the first end cap portion 164 to prevent fluid bypass therebetween. If an adhesive is used, that same adhesive can be used to secure the filter media 146 to the first end cap portion 164. Alternatively, the filter media 146 could be embedded in the first end cap portion 164 or otherwise sealingly attached together. Ultrasonic welding or chemical bonding could be used between the media 146 and the first end cap portion 164.

The centertube 186 further includes a helical fin 218 to direct fluid that is passed through the filter media 146 proximate the first end 150 thereof axially along the central axis 134 towards the inlet region 194 of the centertube 186. The fin 218 above the inlet region 194 is generally provided by a single continuous helical fin. The fin 218 is preferably sized such that it provides radial support for the inner diameter or inner periphery of the tube of filter media 146.

At a second end 220 of the centertube 186, the centertube 186 includes an axially extending wall 222 that is axially received in an annular well 224 of the second end cap portion 184 when a filter cartridge 112 is assembled. Again, this wall 222 can be adhesively attached to the second end cap 184 to prevent fluid bypass therebetween. Alternatively, the centertube 186 could be ultrasonically or otherwise welded to the second end cap 184. Further, any plastisol or other adhesive that is used to secure the filter media 146 to the second end cap 184 could be used to also secure the centertube 186 to the second end cap portion 184 as well as to seal passage 176 to second end cap 184 if an o-ring is not used.

In a preferred embodiment the tube of filter media 146 is configured to strip the water from the dirty fluid 114. In an alternative embodiment, a separate type of media or a stripping type of screen can be placed around the tube of filter media 146. However, other means for removing the water from the flow of dirty fluid can also be implemented in embodiments of the present invention. It is a benefit of the illustrated embodiment that when the filter assembly 100 is fully assembled and operable, the sump region 178 is generally vertically below the filter cartridge 112 such that gravity can be used to assist in transferring the stripped water to the sump region. However, due to this arrangement, the return flow passage 176 through the filter cartridge 112 is generally not used as an air return passage used during priming of the filter assembly 100 at maintenance intervals. This is because the filter housing 104 and filter cartridge 112 will generally fill with fluid that will cover the inlet 180 such that air cannot pass therethrough during a priming process. Further, the return flow passage 176 is sized larger than a typical vent passage such that it is large enough to allow the flow of stripped water therethrough.

In operation, a method of filtering dirty fluid is provided. The method includes receiving dirty fluid through a dirty fluid inlet 154 of the filter cartridge 112 via a dirty fluid port 106 in the filter base 102. The dirty fluid 114 will flow radially outward through a radially outward directed flow passage 166 formed in the first end cap portion 164. This flow of fluid in the radially outward direction is relative to the central axis 134 and is generally axially spaced from the tube of filter media 146. As such, the first end 150 of the filter media 146 is positioned axially between the radially outward directed flow passage 166 and the second end 152 of the tube of filter media 146.

After passing radially outward, the dirty fluid will flow axially downward towards the second end 152 of the tube of filter media 146. This dirty fluid which is external to the tube of filter media 146 will then flow radially through the tube of filter media and be cleaned by the tube of filter media 146. Further, as the dirty fluid is external to the tube of filter media 146 and then transfers through the tube of filter media 146, water that is carried thereby can be stripped from the dirty fluid. This water will flow axially towards the bottom of the housing 104 toward sump region 178. The fluid that is passed through the tube of filter media 146 will turn into clean fluid and will be positioned within central cavity 148. The clean fluid 116 will travel towards the inlet region 194 of the centertube 186. The clean fluid 116 will pass through the clean flow passage 182 toward the clean fluid outlet 156 of the filter cartridge where it will transfer to the clean fluid port 108 of the filter base 102 and travel to the downstream system for use thereby.

The separated water 118 in the sump region will be drawn through the inlet 180 and into return flow passage 176 where it will also travel through central cavity 148 of the tube of filter media 146. However, this flow of separated water will be separated from the flow of clean fluid that is also within the central cavity 148 of the tube of filter media 146. The separation is provided by centertube 186 of the illustrated embodiment. The separated water will flow along the return flow passage 176 to the return outlet 158 and then into the return port 110 of the filter base. Separated water can then be returned back to the fluid storage tank or other storage area for the water, which is an impurity, of the dirty fluid. It is noted that the fluid that passes through the return outlet 158 never passes through the tube of filter media 146.

The present filter assembly 100 also includes various additional features for securing the combined filter cartridge and filter housing (which may also be referred to as a filter element) to the filter base 102. For instance, the system utilizes a torsion lock arrangement as described in U.S. patent application Ser. No. 12/139,734, entitled FILTER ELEMENT AND FILTER ASSEMBLY INCLUDING LOCKING MECHANISM, filed Jun. 16, 2008, and assigned to the assignee of the instant application. The teachings and disclosures thereof are incorporated herein by reference thereto. Further, the system utilizes a filter cartridge ejection mechanism or arrangement for automatically assisting in removing the filter cartridge 112 from the filter housing 104 as the filter housing 104 and filter cartridge 112 are removed from the filter base 102 during maintenance intervals. A representative auto-ejection mechanism is illustrated in U.S. patent application Ser. No. 13/360,181, entitled FILTER APPARATUS WITH EJECTION ARRANGEMENT, filed Jan. 27, 2012, and assigned to the assignee of the instant application. The teachings and disclosures thereof are incorporated herein by reference thereto.

Figure 6:
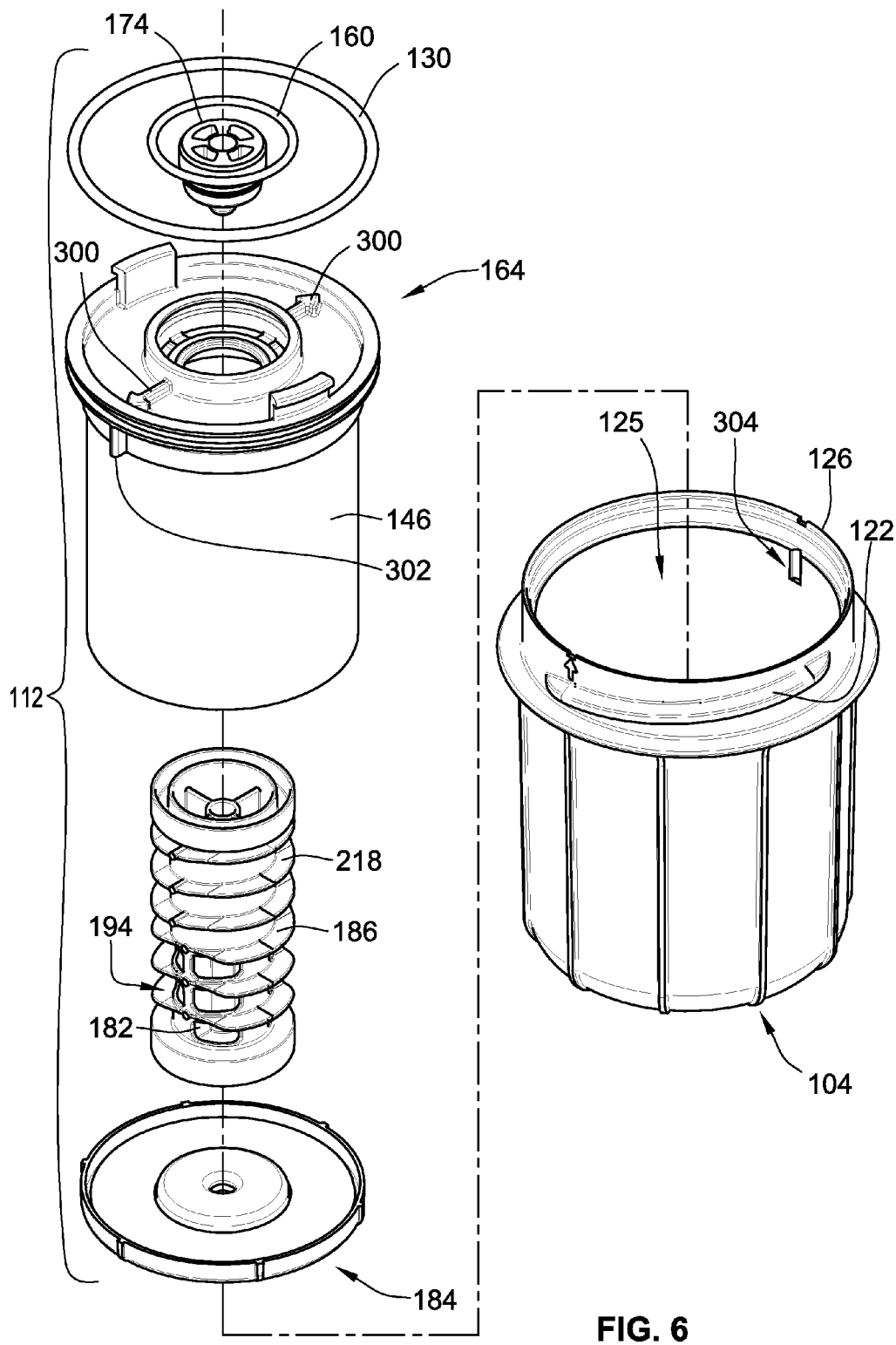
FIG. 6 is a perspective exploded illustration of the filter cartridge and filter housing of the filter assembly of FIG. 1.
Figure 7:
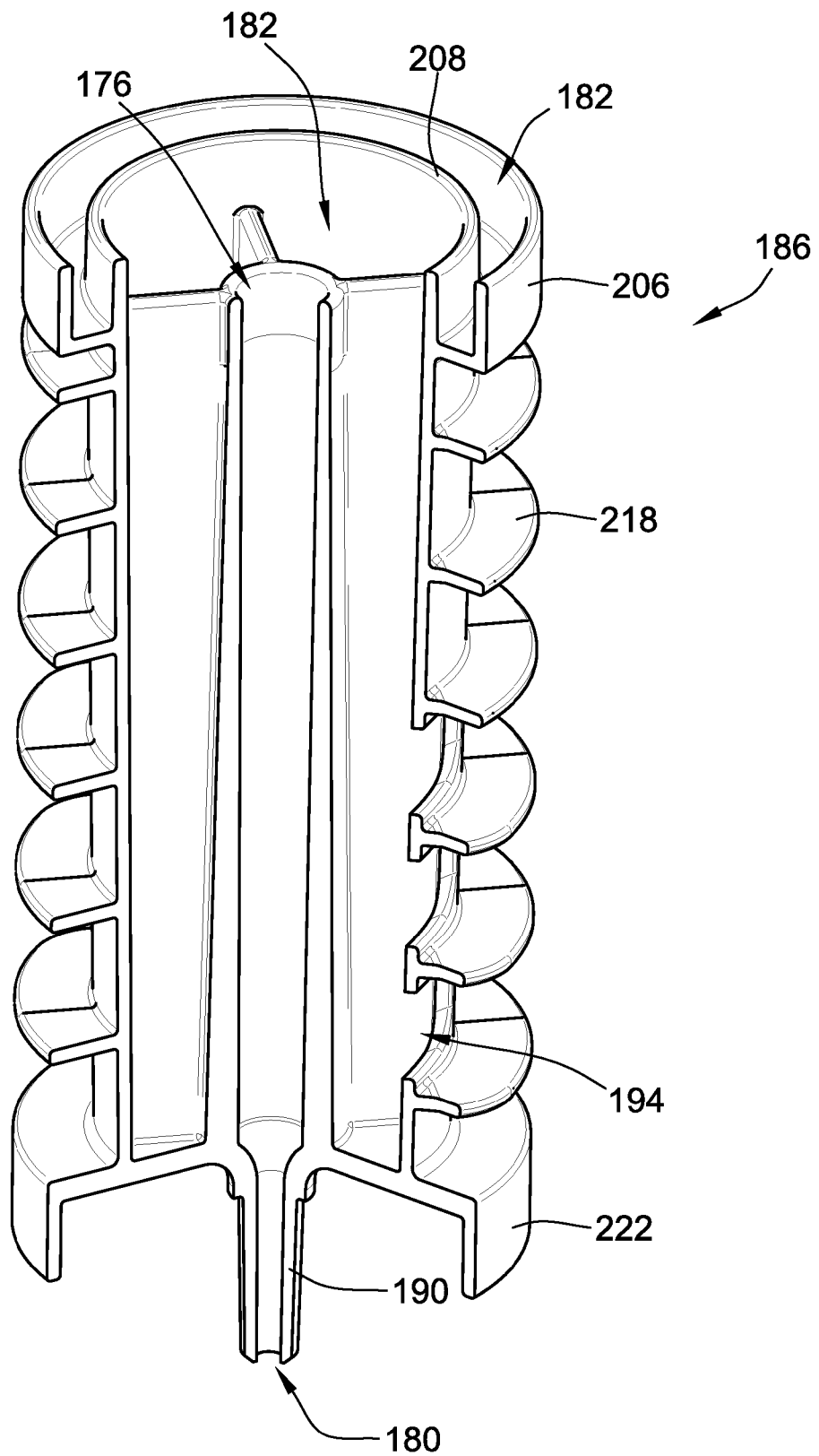
FIG. 7 is a cross-sectional illustration of a centertube of the filter cartridge of the filter assembly of FIG. 1.

Briefly, and with reference to FIG. 6, the filter housing includes ribs 300 on the first end cap 164 that cooperate with the torsion lock structure of the filter base 100. Further, the filter cartridge 112 includes keys 302 that angularly engage corresponding channels 304 of the filter housing 104. The engagement of the keys 302 and channels 304 prevent rotational motion of the filter housing 104 relative to the filter cartridge 112 during assembly and disassembly processes. This allows for the operation of both the torsion lock features, as well as the auto-ejection mechanisms. This is because when a user rotates the housing 104 so as to remove it from the filter base via the threaded arrangement, the first end cap 164 is forced to also rotate with the housing. The filter cartridge 112 also includes ejection tabs that are used to engage a corresponding shelf of the filter base 102.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter cartridge for use in a reusable filter housing and for filtering dirty fluid supplied by a dirty fluid port of a filter base to which the filter cartridge and filter housing are releasably attachable, the filter base including a clean fluid port through which cleaned fluid exits and a return port through which separated water separated from the dirty fluid exits, the filter cartridge comprising:
   a tube of filter media extending between first and second ends along a longitudinal axis and defining a central cavity;
   a first end cap portion sealingly attached to the first end of the tube of filter media, the first end cap portion carrying:
   a dirty fluid inlet defined by a dirty fluid inlet seal arrangement that fluidly seals with and fluidly communicates with the dirty fluid port of the filter base on an upstream side of the tube of filter media;
   a clean fluid outlet defined by a clean fluid outlet seal arrangement that fluidly seals with and fluid communicates with the clean fluid port of the filter base on a downstream side of the tube of filter media, the tube of filter media being fluidly interposed between the dirty fluid inlet and the clean fluid outlet such that fluid flow through the clean fluid outlet must pass through the tube of filter media;
   a return outlet define a return outlet seal arrangement that fluidly seals with and fluidly communicates with the return port, flow of separated water through the return outlet bypassing the tube of filter media and flowing operably through the central cavity of the tube of filter media separated from both clean fluid and dirty fluid flows
   wherein the dirty fluid inlet seal arrangement includes a first radially inward directed seal and a first radially outward directed seal, the first radially outward directed seal having a smaller diameter than the first radially inward directed seal, the dirty fluid inlet being the annular gap formed between the first radially inward directed seal and the first radially outward directed seal of the dirty fluid inlet seal arrangement;
   the clean fluid outlet seal arrangement includes a second radially inward directed seal and the first radially outward directed seal, the second radially inward directed seal being positioned radially inward relative to the first radially outward directed seal, the clean fluid outlet being the gap formed between the first radially outward directed seal and the second radially inward directed seal; and
   the return outlet seal arrangement provided by the second radially inward directed seal.

2. The filter cartridge of claim 1, wherein the dirty fluid inlet is spaced axially from the first end of the filter media along the longitudinal axis and is positioned, at least in part, radially inward from an outer diameter of the tube of filter media, the first end cap portion defining a radially outward directed flow passage that extends radially outward relative to the longitudinal axis when flowing in the downstream direction from the dirty fluid inlet.

3. The filter cartridge of claim 2, wherein the radially outward directed flow passage is spaced axially from the first end of the tube of filter media.

4. The filter cartridge of claim 1, wherein the second radially inward directed seal and the first radially outward directed seal are provided by a single seal member.

5. The filter cartridge of claim 4, wherein the first radially inward directed seal is provided by a second seal member.

6. The filter cartridge of claim 5, further comprising a second radially outward directed seal proximate an outer radial periphery of the first end cap portion, the second radially outward directed seal configured to seal with a radially inward directed seal surface of the filter housing to seal the filter cartridge within the filter housing.

7. The filter cartridge of claim 1, further comprising:
   a return flow passage extending through the central cavity of the tube of filter media, the return flow passage fluidly interposed between the dirty fluid inlet and the return outlet, the flow of separated water passing through the return flow passage;
   a clean flow passage extending through the central cavity from a downstream side of the tube of filter media to the clean fluid outlet, the clean flow passage being fluidly separated from the return flow passage.

8. The filter cartridge of claim 7, further comprising a second end cap portion attached to the second end of the tube of filter media, the second end cap portion including a central aperture passing therethrough, the return flow passage fluidly communicating with an exterior of the tube of filter media through the central aperture.

9. The filter cartridge of claim 8, further comprising a centertube portion positioned within the central cavity of the tube of filter media, the centertube portion including a central passage providing the return flow passage, the central passage in fluid communication with the exterior of the tube of filter media through the central aperture of the second end cap portion.

10. The filter cartridge of claim 9, wherein the central passage of the centertube portion includes an inlet axially spaced apart from the return outlet, the inlet being spaced axially away from the second end of the tube of filter media with the inlet being positioned outside of the central cavity of the tube of filter media.

11. The filter cartridge of claim 8, wherein the centertube portion includes a second fluid passage radially spaced from the central passage, the second fluid passage providing the clean flow passage, the second fluid passage having an inlet within the central cavity of the tube of filter media and fluidly communicating with the clean fluid outlet through the second fluid passage.

12. The filter cartridge of claim 11, wherein the inlet of the second fluid passage is positioned axially along the longitudinal axis closer to the second end of the tube of filter media than the first end of the tube of filter media.

13. The filter cartridge of claim 10, wherein the centertube portion includes an axially extending tubular portion that extends axially through the central aperture of the second end cap portion, the distal end of the axially extending tubular portion defining the inlet of the central passage.

14. A filter assembly comprising:
   a filter base including a dirty fluid port, a clean fluid port and a return port:
   a first generally tubular portion extending axially along a longitudinal axis defining a first radially outward directed sealing surface and a first radially inward directed sealing surface having a smaller diameter than the first radially outward directed sealing surface, the first generally tubular portion defining the dirty fluid port positioned radially between the first radially outward directed sealing surface and the first radially inward directed sealing surface; and
   a second generally tubular portion extending axially along the longitudinal axis defining a second radially outward directed sealing surface having an outer diameter that is less than the diameter of the first radially inward directed sealing surface and a central channel, the central channel forming the return port, the clean fluid port being formed between the first radially inward directed sealing surface and the second radially outward directed sealing surface;
   a filter housing removable attached to the filter base defining an internal cavity; and
   a filter cartridge removably positioned within the internal cavity of the filter housing, the filter cartridge including:
   a tube of filter media extending between first and second ends along the longitudinal axis and defining a central cavity;
   a first end cap portion sealingly attached to the first end of the tube of filter media, the first end cap portion carrying:
   a dirty fluid inlet defined by a dirty fluid inlet seal arrangement that fluidly seals with the first radially outward directed sealing surface and the first radially inward directed sealing surface, the dirty fluid inlet fluidly communicates with the dirty fluid port of the filter base on an upstream side of the tube of filter media;
   a clean fluid outlet defined by a clean fluid outlet seal arrangement that fluidly seals with first radially inward directed sealing surface and the second radially outward directed sealing surface, the clean fluid outlet fluidly communicates with the clean fluid port of the filter base on a downstream side of the tube of filter media, the tube of filter media being fluidly interposed between the dirty fluid inlet and the clean fluid outlet such that fluid flow through the clean fluid outlet must pass through the tube of filter media; and
   a return outlet defined by a return outlet seal arrangement that fluidly seals with the second radially outward directed sealing surface, the return outlet fluidly communicates with the return port;
   the filter cartridge and filter housing defining a sump region therebetween that is upstream of the return outlet, the sump region collecting water separated from dirty fluid external of the tube of filter media, the return outlet in fluid communication with the sump region through the central cavity of the tube of filter media.

15. The filter assembly of claim 14, wherein the dirty fluid inlet seal arrangement includes a first radially inward directed seal and a first radially outward directed seal, the first radially outward directed seal having a smaller diameter than the first radially inward directed seal, the dirty fluid inlet being the annular gap formed between the first radially inward directed seal and the first radially outward directed seal of the dirty fluid inlet seal arrangement;
   the clean fluid inlet seal arrangement includes a second radially inward directed seal and the first radially outward directed seal, the second radially inward directed seal being positioned radially inward relative to the first radially outward directed seal, the clean fluid outlet being the gap formed between the first radially outward directed seal and the second radially inward directed seal; and
   the return outlet seal arrangement provided by the second radially inward directed seal.

16. The filter assembly of claim 14, wherein the dirty fluid inlet is spaced axially from the first end of the filter media along the longitudinal axis and is positioned, at least in part, radially inward from an outer diameter of the tube of filter media, the first end cap portion defining a radially outward directed flow passage that extends radially outward relative to the longitudinal axis when flowing in the downstream direction from the dirty fluid inlet.

17. The filter assembly of claim 16, wherein the radially outward directed flow passage is spaced axially from the first end of the tube of filter media.

18. The filter assembly of claim 15, wherein the second radially inward directed seal and the first radially outward directed seal are provided by a single seal member.

19. The filter assembly of claim 18, wherein the first radially inward directed seal is provided by a second seal member.

20. The filter assembly of claim 19, further comprising a second radially outward directed seal proximate an outer radial periphery of the first end cap portion, the second radially outward directed seal configured to seal with a radially inward directed seal surface of the filter housing to seal the filter cartridge within the filter housing.

21. The filter assembly of claim 14, further comprising:
   a return flow passage extending through the central cavity of the tube of filter media, the return flow passage fluidly interposed between the dirty fluid inlet and the return outlet, the flow of separated water passing through the return flow passage;
   a clean flow passage extending through the central cavity from a downstream side of the tube of filter media to the clean fluid outlet, the clean flow passage being fluidly separated from the return flow passage.

22. The filter assembly of claim 21, further comprising a second end cap portion attached to the second end of the tube of filter media, the second end cap portion including a central aperture passing therethrough, the return flow passage fluidly communicating with an exterior of the tube of filter media through the central aperture.

23. The filter assembly of claim 22, further comprising a centertube portion positioned within the central cavity of the tube of filter media, the centertube portion including a central passage providing the return flow passage, the central passage in fluid communication with the exterior of the tube of filter media through the central aperture of the second end cap portion.

24. The filter assembly of claim 23, wherein the central passage of the centertube includes an inlet axially spaced apart from the return outlet, the inlet being spaced axially away from the second end of the tube of filter media with the inlet being positioned outside of the central cavity of the tube of filter media.

25. The filter assembly of claim 22, wherein the centertube portion includes a second fluid passage radially spaced from the central passage, the second fluid passage providing the clean flow passage, the second fluid passage having an inlet within the central cavity of the tube of filter media and fluidly communicating with the clean fluid outlet through the second fluid passage.

26. The filter assembly of claim 25, wherein the inlet of the second fluid passage is positioned axially along the longitudinal axis closer to the second end of the tube of filter media than the first end of the tube of filter media.

27. The filter assembly of claim 24, wherein the centertube includes an axially extending tubular portion that extends axially through the central aperture of the second end cap portion, the distal end of the axially extending tubular portion defining the inlet of the central passage.

28. A filter assembly comprising:
a filter base including:
a first generally tubular portion extending axially along a longitudinal axis defining a first radially outward directed sealing surface and a first radially inward directed sealing surface having a smaller diameter than the first radially outward directed sealing surface, the first generally tubular portion defining a dirty fluid port positioned radially between the first radially outward directed sealing surface and the first radially inward directed sealing surface; and
a second generally tubular portion extending axially along the longitudinal axis defining a second radially outward directed sealing surface having an outer diameter that is less than the diameter of the first radially inward directed sealing surface and a central channel, the central channel forming a return port, a clean fluid port being formed between the first radially inward directed sealing surface and the second radially outward directed sealing surface;
a filter housing removably attached to the filter base defining an internal cavity; and
a filter cartridge removably positioned within the internal cavity of the filter housing, the filter cartridge including:
a tube of filter media extending between first and second ends along the longitudinal axis that is parallel to the longitudinal axis and defining a central cavity;
a dirty fluid inlet that seals with and fluidly communicates with the dirty fluid port of the filter base on an upstream side of the tube of filter media;
a clean fluid outlet that seals with and fluidly communicates with the clean fluid port on a downstream side of the tube of filter media;
a return outlet that seals with and fluidly communicates with the return port;
the filter cartridge and filter housing defining a sump region therebetween that is upstream of the return outlet, the sump region collecting water separated from dirty fluid external of the tube of filter media, the return outlet in fluid communication with the sump region through the central cavity of the tube of filter media.

* * * * *